(12) United States Patent
Leaman

(10) Patent No.: US 8,291,813 B2
(45) Date of Patent: Oct. 23, 2012

(54) TOASTER

(75) Inventor: Keith Leaman, Havant (GB)

(73) Assignee: Kenwood Limited, Hampshire (GB)

( * ) Notice: Subject to any disclaimer, the term of this patent is extended or adjusted under 35 U.S.C. 154(b) by 555 days.

(21) Appl. No.: 11/994,850

(22) PCT Filed: Jul. 3, 2006

(86) PCT No.: PCT/GB2006/002457
§ 371 (c)(1),
(2), (4) Date: Feb. 7, 2008

(87) PCT Pub. No.: WO2007/007038
PCT Pub. Date: Jan. 18, 2007

(65) Prior Publication Data
US 2009/0301313 A1   Dec. 10, 2009

(30) Foreign Application Priority Data
Jul. 7, 2005  (GB) .................................. 0513913.4

(51) Int. Cl.
*A47J 37/08* (2006.01)
(52) U.S. Cl. ................. 99/393; 99/390; 99/391; 99/392
(58) Field of Classification Search .................. 99/390, 99/392, 393, 385–389, 391, 394–402, 329 P, 99/329 RT; 219/521; D7/390, 411
See application file for complete search history.

(56) References Cited

U.S. PATENT DOCUMENTS

| | | | |
|---|---|---|---|
| 1,903,324 A | 6/1931 | Codling | |
| 2,491,829 A * | 12/1949 | Palmer et al. | 99/391 |
| 2,981,364 A * | 4/1961 | Webber | 182/159 |
| 3,641,921 A * | 2/1972 | Toyooka et al. | 99/390 |
| D450,975 S | 11/2001 | Aeschbacher | |
| D489,565 S | 5/2004 | Averty | |
| D505,585 S | 5/2005 | MacWilliam | |
| D506,348 S | 6/2005 | Josancy | |
| 7,047,871 B1 * | 5/2006 | Christoffel | 99/327 |
| D524,591 S | 7/2006 | Averty | |
| D525,473 S | 7/2006 | Brown | |
| D525,817 S | 8/2006 | Brown | |
| D547,591 S | 7/2007 | De'Longhi | |
| D590,200 S | 4/2009 | Mullen | |
| 2004/0000238 A1 * | 1/2004 | Nguyen | 99/389 |

* cited by examiner

*Primary Examiner* — Henry Yuen
*Assistant Examiner* — John Wasaff
(74) *Attorney, Agent, or Firm* — Martin Fleit; Paul D. Bianco; Fleit Gibbons Gutman Bongini & Bianco PL

(57) ABSTRACT

A variable-width toaster is described, in which the food-supporting carriage (5, 60) adapts readily, robustly and in a cost-effective manner to different width settings of the toasting chamber (2, 70). Respective elongate members (51, 52; 61, 62) are mounted to either side of the toasting chamber and are linked together by linking members (53a-53n; 63a, 63b) which form part of the food-supporting surface and are pivotally attached to the elongate members to accommodate lateral relative movement between the elongate members as the width of the toasting chamber is varied. In one embodiment, unitary linking members (53a-53n) link the two elongate members (51, 52) and the elongate members are urged apart by a spring (54). In another embodiment, chevron-like linking members, comprising pairs of pivotally associated linking members (63a, 63b) are employed.

16 Claims, 2 Drawing Sheets

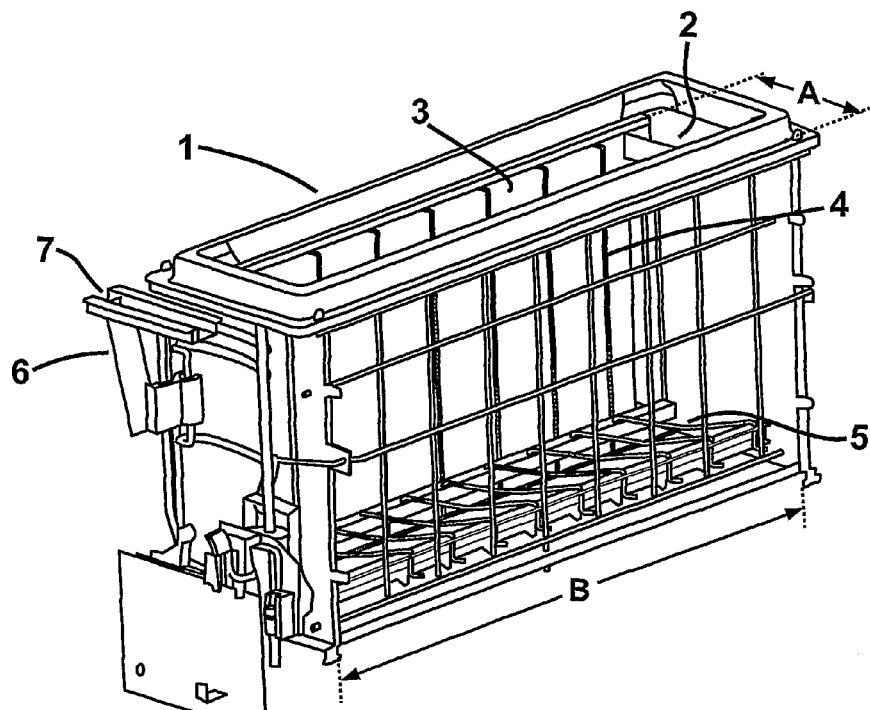
Fig 1(a)
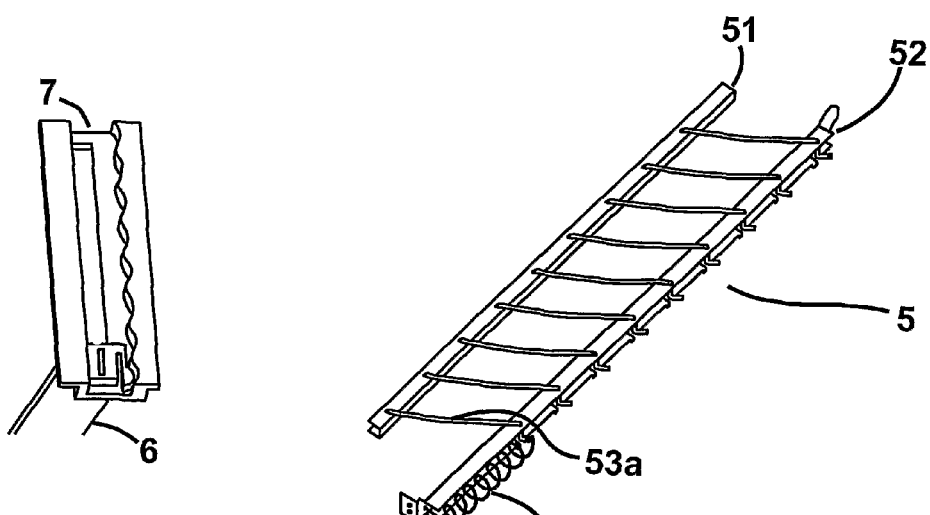
Fig 1(b)
Fig 2

TOASTER

FIELD OF THE INVENTION

This invention relates to toasters, and it relates especially, though not exclusively, to toasters intended for use in the domestic kitchen.

BACKGROUND OF THE INVENTION

Electrically operated toasters are stock items in most domestic kitchens, and they tend to be reasonably robust and reliable in use, despite the relatively modest purchase prices which have come to be established for them. Changes in traditional eating habits, however, leading to the development of popular taste for a wider variety of toastable foodstuffs, have recently led to technical developments which have increased the sophistication of toasters, enhancing their efficiency and providing greater flexibility of use.

One particular aspect of toasters which has received attention in this respect is their ability to cope with foodstuffs of quite widely differing dimensions; in particular, the thickness dimension of foodstuffs which users may wish to toast can vary widely. Several proposals have thus been made for so-called "variable slot" toasters which can accommodate foodstuffs having width dimensions ranging from relatively narrow, say for thinly-sliced bread, to relatively wide, for bagels and similar products.

Not all of these proposals have been commercially successful, however, and it is believed in this respect that (inter alia) difficulties have been experienced in constructing certain internal components whose dimensions need to change with variations in slot width economically whilst maintaining ruggedness and reliability in operation, bearing in mind that such internal components operate in an extremely hostile and challenging environment.

Such difficulties as aforementioned are particularly acute in respect of the foodstuff-supporting carriage, which is mobile within the toaster slot; this carriage being latched down in a lower position to support the foodstuff adjacent the heater elements whilst it is being toasted, and then released to spring upwards when the toasting cycle is complete, thereby presenting the toasted foodstuff for easy withdrawal from the toaster slot. It is well known for the heating elements to be de-energised when the carriage is raised to its presentation position, and for the latching-down mechanism to be ineffective unless power is applied to the toaster.

It will be appreciated that the carriage needs to be capable of reliably supporting a wide variety of foodstuffs whatever the slot position set by the user, since potentially hazardous situations could arise if this were not the case. For example, the toaster could jam with the carriage down (and thus the heaters energised) if foodstuffs could become entrapped between an edge of the carriage and a heater element or heater support and thus a potential fire hazard could arise. In this respect, it needs to be borne in mind that a user might inadvertently set (or leave) the slot at a wide position whilst attempting to toast a relatively thin food item.

SUMMARY OF THE INVENTION

The present invention aims to provide a variable-slot toaster with a carriage which is capable of adapting reliably to variations in slot width and which is economic to manufacture.

According to the invention there is provided a toaster having a slot-like chamber into which foodstuffs to be toasted can be placed, the chamber being flanked by respective heating elements; a carriage having a foodstuff-supporting surface; a support structure for said carriage configured to permit the carriage to be latched in a lower position at which foodstuffs are exposed to said heating elements for toasting, for releasing said carriage on completion of a toasting cycle, and for raising the carriage to an upper, presentation position in which toasted foodstuffs can be removed from the toaster; and user-operable means for varying the width dimension of the chamber to accommodate foodstuffs of differing thickness; wherein the carriage comprises first and second elongate members extending along the length dimension of said chamber and disposed respectively to one and the other side of said chamber; a plurality of linking members linking said elongate members and pivotally mounted to each, said linking members collectively presenting at least a substantial part of the foodstuff-supporting surface of the carriage; and control means maintaining said elongate members in contact with opposing sides of the chamber such that said elongate members move relative to one another when the width dimension of the chamber is varied; such movement of the elongate members being accommodated by pivotal movement of said linking members, whereby said carriage adapts automatically to said variations in the width dimension of said chamber.

In one preferred embodiment, the control means comprises latching means latching the elongate members to opposing sides of the chamber, whereby movement in the width dimension of the chamber pushes said elongate members closer together or pulls them farther apart, depending upon the user-selected setting of the said width dimension.

By this means, no dedicated operational means are required to adapt the width of the carriage to variations in the width dimension of the chamber.

Conveniently in such an arrangement the linking means comprise a plurality of chevron-like links distributed along the length of the elongate members and having pivots at the chevron points permitting the chevron angle to vary with variations in the width dimension of the chamber.

The chevron-like links may be regularly distributed along the length of the elongate members, and the elongate members may be notched to receive the chevron point pivots when the chamber is adjusted to its narrowest width dimension.

In another preferred embodiment, the control means includes resilient means acting upon at least one of said linking members for urging said elongate members apart.

In one such preferred embodiment, the resilient means comprises a coil spring, configured to operate in either compression or tension, fixedly supported upon one of said elongate members and connected to at least one of said linking members. By this means, the necessary resilient urge is applied in a simple and cost-effective manner.

In another preferred embodiment, the resilient means comprises a torsion spring; the shape and dimensions of which may, in some configurations, prove more convenient or more compact in use than a coil spring.

In other preferred embodiments, the resilient urge is provided by plural spring members carried by one of said elongate members; each of said spring members being coupled between a respective fixed location on said elongate means and a respective one of said linking members. It is further preferred that said spring members are evenly distributed among said linking members. In such circumstances, coil springs or torsion springs, or a combination of both, may be used.

It is further preferred that pivotal mounting points for the linking members are regularly distributed along the elongate members, thereby providing an even distribution of the resilient urging force.

BRIEF DESCRIPTION OF THE DRAWINGS

In order that the invention may be clearly understood and readily carried into effect, embodiments thereof will now be described, by way of example only, with reference to the accompanying drawings, of which:

FIG. 1(a) shows, in perspective view, part of a toaster in accordance with a first embodiment of the invention, with a wall of the toasting chamber removed to illustrate the carriage in relation to other internal components of the toaster;

FIG. 1(b) shows a plan detail of a slider component of the toaster;

FIG. 2 shows, in perspective view, essential components of a carriage for a toaster in accordance with said first embodiment of the invention.

DETAILED DESCRIPTION OF THE INVENTION

Figure 3:
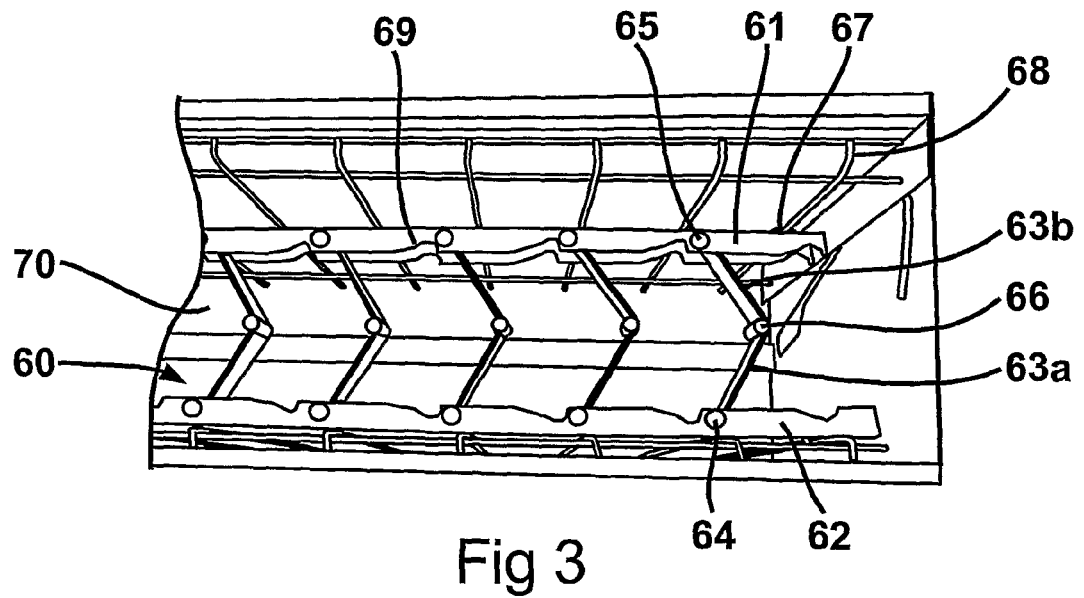
FIGS. 3, 4 and 5 show, in a partial plan view from the top, essential components of a carriage for a toaster in accordance with a second embodiment of the invention, respectively disposed at wide (FIG. 3), medium (FIG. 4) and narrow (FIG. 5) settings.

Referring now to FIGS. 1 and 2 of the drawings, a toaster in accordance with one embodiment of the invention comprises a main housing 1 in which is defined a slot-like toasting chamber 2, flanked by respective heating elements, such as that shown at 3, of any convenient kind. The heating elements are typically substantially rectangular, planar elements as shown, supported in known manner so as to stand vertically to either side of chamber 2, effectively forming side-walls thereof. Each heating element is, in this example, protected by a grid-like guard member 4 from direct contact with the foodstuffs inserted into the chamber 2.

A food-supporting carriage 5 is provided in the chamber 2, and the carriage is supported, in known manner, by means of a conventional support structure (not shown) configured to permit the carriage to be latched in a lower position at which foodstuffs are exposed to said heating elements for toasting, for releasing said carriage upon completion of a toasting cycle, and for raising the carriage to an upper, presentation position in which toasted foodstuffs can be removed from the toaster.

User-operable means, including a slider mechanism 6 is provided for varying the width dimension A of the chamber to accommodate foodstuffs of differing thickness. In this example, the mechanism 6 is disposed internally of an outer casing (not shown) of metal or plastics material and is operated by means of a lever arrangement (not shown) accessible to the user externally of the casing. The internal mechanism 6 includes, in this example, a slot arrangement 7 (best seen in FIG. 1(b)) comprising several constrictions which define respective discrete width settings for the slot-like chamber 2. In alternative embodiments, the width setting may be smoothly variable to any chosen position between two extreme end stops.

As shown in more detail in FIG. 2, the carriage 5 comprises first and second elongate members 51 and 52 extending along the length dimension B of said chamber and disposed respectively to one and the other side of the chamber 2. A plurality of linking members 53a to 53n are provided, each linking the elongate members 51 and 52 and pivotally mounted to each elongate member; and resilient means 54 are provided to urge the elongate members 51 and 51 apart whereby the carriage 5 adapts automatically to variations in the width dimension A of the chamber. In this respect, it will be appreciated that in this embodiment the member 52 remains in contact with the heater guard in its side of the slot 2 whilst the member 51 is mobile laterally of the toaster slot; moving towards or away from the member 52 as appropriate to maintain contact with the heater guard at the other side of the slot. The member 51 is either pushed towards the member 52 by contact with the heater guard 4 when the slot 2 is narrowed by a user, or urged away from the member 52 by the resilient means 54 when the slot 2 is widened.

In this example of the invention, the resilient means 54 comprises a single coil spring, fixedly supported upon the elongate member 52 and configured to operate in compression, though it could alternatively, be mounted and configured so as to operate in tension, depending upon the detailed construction of the assembly. Also in this example, the spring is connected to the linking member 53a but it could alternatively, or in addition, be connected to one or more of the other linking members. By this means, in any event, the necessary resilient urge is applied in a simple and cost-effective manner.

In further alternative configurations, the resilient urge may be provided by a torsion spring, and/or by plural spring members of any convenient kind carried by one, the other, or both of the elongate members 51 and 52; each such spring member being coupled between a respective fixed location on its elongate means and a respective one or more of the linking members. If plural spring members are provided, it is preferable to distribute them evenly among said linking members.

It is particularly preferred (though not essential) that pivotal mounting points for the linking members 53a to 53n are regularly distributed along the elongate members 51 and 52, thereby providing an even distribution of the resilient urging force.

In some preferred embodiments of the invention, the mobile member 51 (or at least a part thereof) is usefully made of, or coated with, a robust and slippery material, such as a ceramic or a non-stick material such as that sold under the registered trademark Teflon®, which will resist repeated wiping contact with the heater guard 4.

Figure 4:
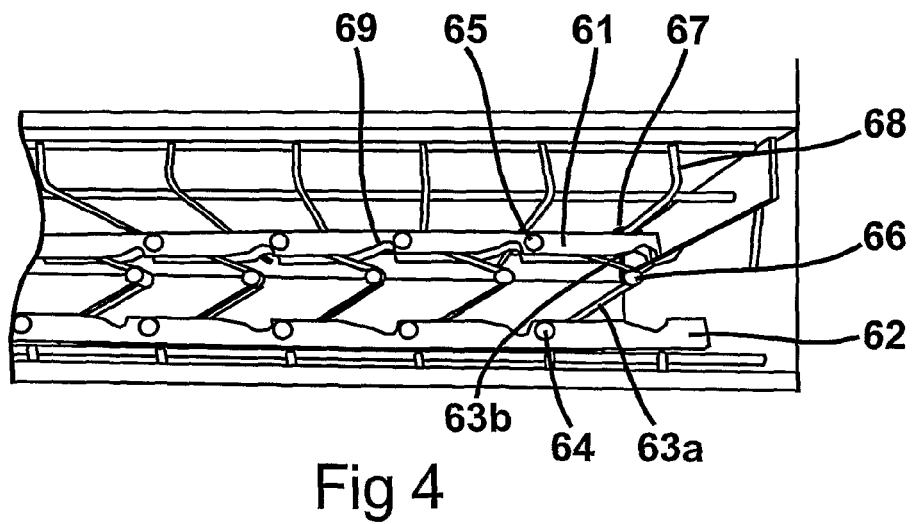
Figure 5:
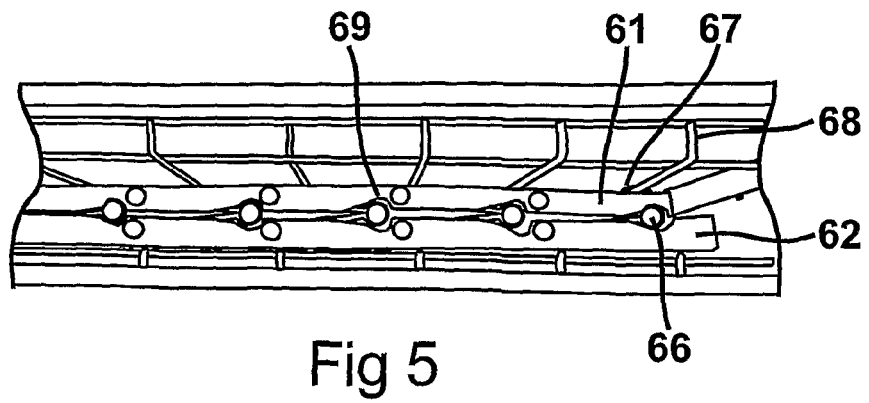

Referring now to FIGS. 3, 4 and 5, which show various operational thickness settings for a toaster in accordance with a second embodiment of the invention, the carriage 60 comprises first and second elongate members 61 and 62 extending, as before, along the length dimension B of the toasting chamber 70 and disposed respectively to one and the other side of the chamber 70. A plurality of paired, chevron-like linking members such as 63a and 63b are provided; each linking member being pivotally linked to a respective elongate member 61 or 62 and each pair of linking members, such as 63a and 63b being pivotally linked to each other, as at 64, 65, and 66. Each end of each of the elongate members 61, 62 is secured by means of an eye such as 67 to an upright wire such as 68 forming part of the heater guard at the relevant side of the chamber 70, such that the carriage 60 can execute its required vertical movements simply by each eye such as 67 running up or down on its respective wire such as 68. When the toaster chamber is widened or narrowed, however, the elongate members follow the relevant movement towards or away from another as a result of their direct attachment to the wires such as 68.

In this embodiment of the invention, therefore, there is no need for any resilient means to urge the elongate members apart, as there was in the first embodiment, since the carriage 60 adapts, as a result of its construction, to variations in the width dimension A of the chamber 70 simply by the elongate members 61 and 62 being towards each other or pulled away from each other as appropriate by their direct mechanical connection to the wires such as 68.

It will also be appreciated that, because of the folding capability of the pairs of linking members such as 63*a* and 63*b* afforded by their central pivots such as 66, the overall longitudinal offset between the two elongate members 61 and 62 that needs to be accommodated in the second embodiment of the invention is only around half of that needed for the elongate members 51 and 52 in the first embodiment.

The inner surface of each of the elongate members 61 and 62 (i.e. that surface facing away from the heaters and thus into the interior of the chamber 70) is formed with a plurality of notches, such as 69, to accommodate the central pivots, such as 66, of the respective pairs of linking members, such as 63*a* and 63*b*, when the toasting chamber 70 is set to a narrow setting as illustrated in FIG. 5.

In some preferred embodiments of the invention, the eyes such as 67 are usefully made of, or coated with, a robust and slippery material, such as a ceramic or a non-stick material such as that sold under the registered trademark Teflon®, which will resist repeated wiping contact with the wires such as 68 during upward and downward movements executed by the carriage 60 at various stages during the toasting process. Alternatively, or in addition, the wires such as 68 may be so formed or coated. Alternatively, any convenient form of linear bearing capable of operating in the toasting chamber environment can be used to link the elongate members 61 and 62 to the wires such as 68.

The invention claimed is:

1. A toaster comprising:
   a slot-like chamber for receiving foodstuffs to be toasted, the chamber a permanent part of the toaster and being flanked by heating elements, the heating elements enclosed within a guard;
   a carriage permanently-retained within said toaster and having a substantially planar foodstuff-supporting surface;
   a support structure for said carriage configured to permit the carriage to be latched in a lower position at which foodstuffs are exposed to said heating elements for toasting, for automatically releasing said carriage on completion of a toasting cycle, and for automatically raising the carriage in a vertical direction to an upper presentation position in which toasted foodstuffs can be removed from the toaster, leaving the carriage in place within said toaster; and
   user-operable means for varying a width dimension of the chamber to accommodate foodstuffs of differing thickness; wherein said carriage comprises:
   first and second elongate members extending horizontally in a direction substantially perpendicular to the vertical direction along a full length dimension of said slot-like chamber and disposed respectively to one and an other side of said chamber;
   linking means including a plurality of linking members distributed along substantially an entire length of the elongate members from one end to another end, the members linking said elongate members and pivotally mounted to each, said linking members collectively presenting at least a substantial part of the substantially planar foodstuff-supporting surface of the carriage; and
   control means maintaining said elongate members in contact with opposing sides of the chamber such that said elongate members move laterally toward or away from one another when the width dimension of the chamber is varied by the user; such movement of the elongate members being accommodated by pivotal movement of said linking members, whereby said carriage adapts automatically to variations in the width dimension of said chamber.

2. The toaster of claim 1, wherein said control means comprises latching means for latching the elongate members to opposing sides of the chamber, whereby lateral movement in the width dimension of the chamber pushes said elongate members closer together or pulls them farther apart, depending on a setting of width dimension selected by the user.

3. The toaster of claim 1, wherein said linking means comprises a plurality of chevron-like links having pivots at chevron points adopted to permit a chevron angle to vary with variations in the width dimension of the chamber.

4. The toaster of claim 3, wherein said chevron-like links are regularly distributed along substantially the entire length of the elongate members from one end to another end.

5. The toaster of claim 3, wherein said elongate members are notched to receive the pivots when the chamber is adjusted to its narrowest width dimension.

6. The toaster of claim 1, further comprising a plurality of eye members attached to each of said elongate members and each adapted for vertical sliding motion relative to a respective static and upright wire member to accommodate vertical movements of the carriage during a toasting process.

7. The toaster of claim 6, wherein each said eye member and/or each wire member is made of, or coated with, a robust and non-stick material which will resist repeated wiping contact associated with said vertical movements.

8. The toaster of claim 1, wherein said control means comprises resilient means acting upon at least one of said linking members for urging said elongate members apart.

9. The toaster of claim 8, wherein the resilient means comprises a coil spring fixedly supported upon one of said elongate members, configured to operate in either tension or compression and connected to at least one of said linking members.

10. The toaster of claim 8, wherein said resilient means comprises a torsion spring fixedly supported upon one of said elongate members and connected to at least one of said linking members.

11. The toaster of claim 8, wherein said resilient means comprises plural spring members carried by one of said elongate members; each of said spring members being coupled between a respective fixed location on said elongate member and a respective one of said linking members.

12. The toaster of claim 11, wherein said spring members are evenly distributed among said linking members.

13. The toaster of claim 8, wherein pivotal mounting points for the linking members are regularly distributed along the elongate members, thereby providing an even distribution of resilient urging force.

14. The toaster of claim 8, wherein at least a part of one or both of said elongate members is formed of, or coated with, a robust and/or non-stick material to facilitate sliding movement of a member so formed or coated relative to a guard device juxtaposed with a heating element.

15. A toaster comprising:
   a slot-like chamber for receiving foodstuffs to be toasted, the chamber a permanent part of the toaster and being flanked by heating elements, the heating elements enclosed within a guard;
   a carriage permanently-retained within said toaster and having a substantially planar foodstuff-supporting surface;

a support structure for said carriage configured to permit the carriage to be latched in a lower position at which foodstuffs are exposed to said heating elements for toasting, for automatically releasing said carriage on completion of a toasting cycle, and for automatically raising the carriage in a vertical direction to an upper presentation position in which toasted foodstuffs can be removed from the toaster, leaving the carriage in place within said toaster; and user-operable means for varying a width dimension of the chamber to accommodate foodstuffs of differing thickness; wherein said carriage comprises:

first and second elongate members extending horizontally in a direction substantially perpendicular to the vertical direction along a full length dimension of said slot-like chamber and disposed respectively to one and an other side of said chamber;

linking means including a plurality of linking members distributed along substantially an entire length of the elongate members from one end to another end, the members linking said elongate members and pivotally mounted to each, said linking members including a plurality of chevron-like links having pivots at chevron points adopted to permit a chevron angle to vary with variations in the width dimension of the chamber, the chevron-like links collectively presenting at least a substantial part of the substantially planar foodstuff-supporting surface of the carriage; and control means maintaining said elongate members in contact with opposing sides of the chamber such that said elongate members move laterally toward or away from one another when the width dimension of the chamber is varied; such movement of the elongate members being accommodated by pivotal movement of said linking members, whereby said carriage adapts automatically to variations in the width dimension of said chamber.

16. The toaster of claim 15, wherein said elongate members are notched to receive the pivots when the chamber is adjusted to its narrowest width dimension.

* * * * *